(12) United States Patent
Koob et al.

(10) Patent No.: US 9,767,025 B2
(45) Date of Patent: Sep. 19, 2017

(54) WRITE-ONLY DATALESS STATE FOR MAINTAINING CACHE COHERENCY

(75) Inventors: Christopher Edward Koob, Round Rock, TX (US); Dana M. Vantrease, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 920 days.

(21) Appl. No.: 13/449,833

(22) Filed: Apr. 18, 2012

(65) Prior Publication Data

US 2013/0282987 A1    Oct. 24, 2013

(51) Int. Cl.
*G06F 12/0831* (2016.01)
*G06F 12/08* (2016.01)

(52) U.S. Cl.
CPC ......... *G06F 12/0831* (2013.01); *G06F 12/08* (2013.01)

(58) Field of Classification Search
CPC .............................. G06F 12/0831; G06F 12/08
USPC .... 711/141, 143, 145, 146, E12.04, E12.017
See application file for complete search history.

(56) References Cited

U.S. PATENT DOCUMENTS

| | | | |
|---|---|---|---|
| 6,192,451 B1 | 2/2001 | Arimilli et al. | |
| 7,657,710 B2 | 2/2010 | Loewenstein | |
| 7,802,054 B2 * | 9/2010 | Park et al. | 711/117 |
| 2004/0059877 A1 * | 3/2004 | Brown et al. | 711/144 |
| 2004/0111563 A1 | 6/2004 | Edirisooriya et al. | |
| 2007/0005908 A1 | 1/2007 | Lakshmanamurthy et al. | |
| 2008/0147987 A1 * | 6/2008 | Cantin et al. | 711/141 |
| 2009/0164735 A1 * | 6/2009 | Nicholas et al. | 711/141 |
| 2010/0106912 A1 | 4/2010 | Cypher et al. | |

FOREIGN PATENT DOCUMENTS

| | | |
|---|---|---|
| CN | 101093464 A | 12/2007 |
| CN | 101162442 A | 4/2008 |

OTHER PUBLICATIONS

Michael Marty, Cache Coherence Techniques for Multicore Processors, 2008, A dissertation submitted in partial fulfillment of the requirements for the degree of Doctor of Philosophy (Computer Sciences) at the University of Wisconsin—Madison, pp. 1-205.*
International Search Report and Written Opinion—PCT/US2013/036912—ISA/EPO—Jul. 29, 2013.

* cited by examiner

*Primary Examiner* — David X Yi
*Assistant Examiner* — Kamal Dewan
(74) *Attorney, Agent, or Firm* — Qualcomm Incorporated (57) ABSTRACT

Systems and methods for maintaining cache coherency in a multiprocessor system with shared memory, including a write-data-invalid (WDI) state configured to reduce stalls during write operations. The WDI state is a dataless state with guaranteed write permissions. When a first processor of the multiprocessor system makes a write request for a first cache entry of a first cache, the WDI state associated with the first cache entry includes write permissions for the write to directly proceed to one or more higher levels of memory in the shared memory, such that delays associated with obtaining write permissions is reduced at the first cache. The WDI state is treated as an invalid state for a read request to the first cache entry by the first processor.

36 Claims, 5 Drawing Sheets

MESI (CONVENTIONAL)

FIG. 4A

MESI+WDI

WRITE-ONLY DATALESS STATE FOR MAINTAINING CACHE COHERENCY

FIELD OF DISCLOSURE

Disclosed embodiments are directed to systems and methods for maintaining cache coherency in multiprocessor systems. More particularly, exemplary embodiments are directed to a dataless write-data-invalid (WDI) state with write permissions, and designed to reduce delays during write operations in multiprocessor systems with shared memory.

BACKGROUND

In multiprocessor systems with shared memory architectures, maintaining memory or cache coherence is a well recognized challenge. For example, multiprocessor systems may have several processors which may each include one or more levels of cache memory, ultimately coupled to a main memory. Because the main memory is shared among the several processors, it is necessary that a consistent view of the contents of the main memory is provided to all the processors.

It is often the case that updates to data (or instructions), residing in one or more levels of cache may not be immediately reflected in all other occurrences of the same data in the memory system. This destroys coherence. The problem is exacerbated in write-back caches. Writing to caches may be performed as a write-through, wherein every write to a cache causes a synchronous write to the backing storage locations of the data in the next levels of cache and main memory; or a write-back, wherein a data write to the cache is updated in the backing storage locations of the data only when the corresponding cache line (or "cache block") is evicted from the cache. While write-through caches are friendlier to cache coherency, they are also much slower because every cache write suffers from the additional time required to update the backing storage locations. On the other hand, while write-back caches expedite cache writes because only the cache is written during a normal write operation, they may destroy coherency by not immediately updating the newly written data in the backing storage locations.

A commonly used mechanism to maintain coherence particularly in write-back caches involves the so called MESI protocol. The MESI protocol defines the four states: Modified (M), Exclusive (E), Shared (S), and Invalid (I), for every cache line. The Modified state indicates that the cache line is present only in the instant cache, but it is "dirty," i.e. it has been modified from the value in main memory. The Exclusive state indicates that only the instant cache possesses the cache line, and it is "clean," i.e. it matches the value in main memory. The Shared state indicates that the cache line is clean, but copies of the cache line may also be present in one or more other caches in the memory system. The Invalid state indicates that the cache line is invalid. Common variations of the MESI protocol, such as the MOESI protocol, may involve additional states such as an Owned (O) state wherein a cache line is indicated to hold the most recent, but dirty and shared copy of the data.

Coherency is maintained by communication between the various processing elements related to desired memory accesses, and managing permissions for updates to caches and main memory based on the state (M/O/E/S/I) of the cache lines. For example, if a processor in the multiprocessor system desires to write data to a cache line of a level 1 (L1) cache associated with it, then if the cache line is in exclusive (E) state, the processor may write the cache line and update it to a Modified (M) state. On the other hand, if the cache line is in a Shared (S) state, then all other copies of the cache line must be invalidated first before the processor may be permitted to write the cache line. Particular implementations of coherency protocols such as MESI/MOESI are well known in the art and will not be further described herein.

Accordingly, in conventional implementations of coherency protocols such as MESI/MOESI, a write to a cache line may be stalled until write permissions have been obtained. In order to obtain permissions, for example, for a cache line residing in an L1 cache, conventional implementations may require traversing one or more levels down the memory hierarchy to a point of coherence in order to obtain permissions, if the state of the cache line indicates that permissions cannot be obtained locally. In other words, if the state of the cache line in the L1 state dictates that write permissions are not current, then backing storage locations in higher levels of memory hierarchy, such as a level 2 (L2) cache or main memory may need to be queried to determine where the point of coherence for the cache line is (again, based on the state of the cache line in these backing storage locations). This process of obtaining write permissions may incur severe penalties in terms of latency and power.

Some write-back cache architectures may be designed according to a no-write-allocate or write-no-allocate policy. In such architectures, if a miss is encountered for the cache line write in the L1 cache, then the write operation skips allocating the cache line in the L1 cache (i.e. does not fetch the cache line from backing storage locations to the L1 cache) and proceeds to writing the cache line in the backing storage, such as the L2 cache or main memory, where the cache line will be found. However, once again, permissions will need to be obtained at the backing storage location where the cache line is found, thus incurring associated penalties.

Thus, conventional implementations suffer from the aforementioned drawbacks associated with maintaining cache coherency and obtaining permissions for write operations. Accordingly, there is a corresponding need in the art for expediting write operations to caches in multiprocessor systems with shared memory architectures.

SUMMARY

Exemplary embodiments of the invention are directed to systems and methods for maintaining cache coherency in multiprocessor systems, including a write-data-invalid (WDI) state configured to reduce delays during write operations in multiprocessor systems with shared memory, wherein the WDI state comprises a dataless state with write permissions.

For example, an exemplary embodiment is directed to a method of maintaining coherency in a multi-processor system comprising: establishing a state including: a write-data-invalid (WDI) state for a first cache entry in a first cache, wherein the WDI state comprises permission for a first processor associated with the first cache, to write to one or more higher levels of memory hierarchy for a write request to the cache entry by the first processor, and wherein the WDI state is treated as an invalid state for a read request to the first cache entry by the first processor.

Another exemplary embodiment is directed to a multi-processor system comprising: a first processor, a first cache, one or more higher levels of memory hierarchy, and a write-data-invalid (WDI) state associated with a first cache entry of the first cache, wherein the WDI state comprises permission for the first processor to write to the one or more higher levels of memory hierarchy for a write request to the first cache entry by the first processor, and wherein the WDI state is treated as an invalid state for a read request to the first cache entry by the first processor.

Another exemplary embodiment is directed to a multi-processor system comprising: a first processor, a first memory means, one or more higher levels of memory hierarchy, and a write-data-invalid (WDI) means associated with a first entry of the first memory means, wherein the WDI means comprises permission for the first processor to write to the one or more higher levels of memory hierarchy for a write request to the first entry by the first processor, and wherein the WDI means is treated as an invalid state for a read request to the first entry by the first processor.

Yet another exemplary embodiment is directed to a non-transitory computer-readable storage medium comprising code, which, when executed by a processor, causes the processor to perform operations for maintaining coherency in a multi-processor system, the non-transitory computer-readable storage medium comprising: code for establishing a state including: a write-data-invalid (WDI) state for a first cache entry in a first cache, wherein the WDI state comprises permission for a first processor associated with the first cache, to write to one or more higher levels of memory hierarchy for a write request to the cache entry by the first processor, and wherein the WDI state is treated as an invalid state for a read request to the first cache entry by the first processor.

Another exemplary embodiment is directed to a method of managing a cache comprising: receiving a write request for a first cache block from a processor, determining that the first cache block is not present in the cache, executing a read-with-intent-to-modify request for the first cache block, reserving a reserved cache block in the cache, assigning tags associated with the first cache block to the reserved cache block, determining a point of coherence for the first cache block in a memory hierarchy comprising the cache, determining that the first cache block is not available at the point of coherence, establishing a write-data-invalid state for the reserved cache block, and performing a write-through operation to the reserved cache block for data associated with the write request.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments avoid aforementioned problems of conventional multiprocessor systems with shared memory. More particularly, with regard to write operations to caches, embodiments are configured to avoid stalls arising from lack of write permissions. Accordingly, embodiments may improve speeds of write operations while maintaining coherency in an efficient manner. Moreover, embodiments may be configured for write-back caches (which may sometimes be faster than write-through caches as described previously), while also overcoming the drawbacks of write-back caches with regard to maintaining coherency.

In the description herein, the term "write" is used synonymously with "store" operations as is known in the art. Likewise, the term "read" is used synonymously with "load." Further, in the description, references may be made to read/write operations pertaining to "cache blocks," which may refer to a granularity less than that of an entire cache line. However, it will be understood that such references are merely for illustrative purposes and shall not be construed as limiting the scope of the embodiments. For example, disclosed techniques may be easily extended to operations on any other granularity as applicable, such as a cache word, cache line, etc. Correspondingly, with regard to cache coherency, the term "granularity of coherence" may refer to the granularity at which coherence is tracked. Further, it will also be understood that the referenced cache block may comprise data or instructions, even though the description may be provided in terms of write/read operations of data alone. Additionally, references to higher levels of memory hierarchy may include backing storage elements beyond local or first level (L1) caches which may be associated with processors or processing elements. For example, references to higher levels of memory hierarchy herein, may refer to second level (L2) caches, main memory, and one or more levels of memory structures which may be present between L2 caches and main memory.

Exemplary embodiments may define an additional state termed herein as "write-data-invalid (WDI)" for individual cache blocks. While embodiments may define the WDI state for an entire cache line, defining the WDI state for individual cache blocks within a cache line may provide additional flexibility. The WDI state may be defined in addition to or in conjunction with any combination of traditional memory coherence states such as M/O/E/S/I discussed above. When set, the WDI state may indicate that only write-through operations are permitted for the associated cache block, and any read operations to the cache block will be invalid. For example, by setting an exemplary cache block in an L1 cache to a WDI state, embodiments may guarantee write permissions to the cache block in the next higher level. L2 cache, thereby eliminating any delays associated with obtaining write permissions.

Figure 1:
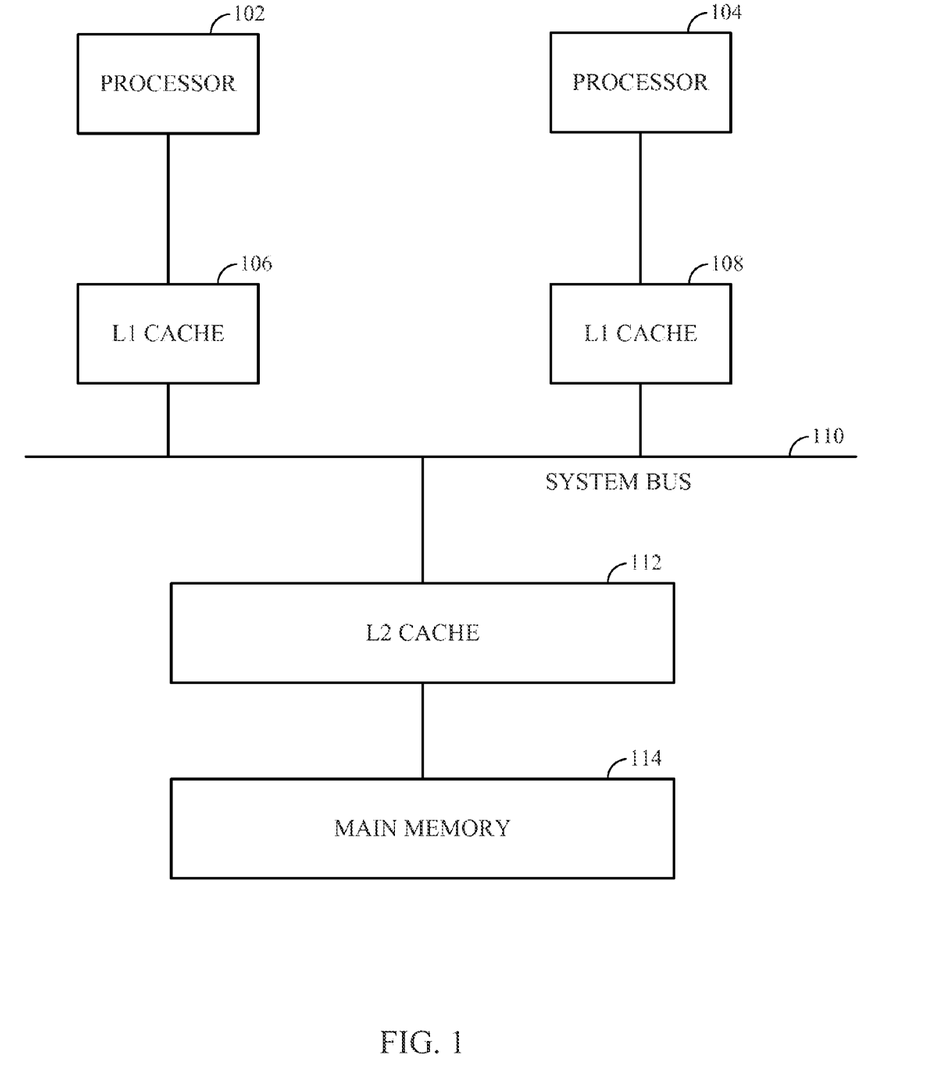
FIG. 1 is a block diagram of an exemplary multiprocessor system 100 configured according to exemplary embodiments.

With reference now to FIG. 1, a simplified schematic depiction of an exemplary multiprocessor system 100 is illustrated. Multiprocessor system 100 may comprise two processors (or processing elements) 102 and 104. Processors 102 and 104 may each have an associated local L1 cache 106 and 108 respectively. L1 caches 106 and 108 may be coupled to shared L2 cache 112 via a network or system bus 110. L2 cache 112 may be coupled to main memory 114. In one embodiment, L1 caches 106 and 108 may be configured as write-back caches. It will be understood that embodiments are not limited in scope to the depicted configuration of multiprocessor system 100, but the disclosed techniques may be easily extended to any other configuration of processors, processing elements, cache structure, and memory architecture.

With continuing reference to FIG. 1, because processors 102 and 104 ultimately share L2 cache 112 and main memory 114, coherency needs to be maintained across caches, such as L1 caches 106 and 108. If, for example, processor 102 desires to write data to a particular cache block CB (which may be of a size that is smaller than an entire cache line), then one of the following scenarios may arise.

In a first scenario, cache block CB may be present in L1 cache 106 associated with processor 102. However, in this first scenario, L1 cache 106 may not have exclusivity with regard to cache block CB, or in other words, cache block CB may be present in an shared (S) state. A description of this scenario with regard to conventional implementations will first be provided in order to explain exemplary embodiments by contrast.

Accordingly, if a conventional MOESI/MESI protocol were in place, then depending on the state associated with the cache block, the cache block may first need to be retrieved from backing storage before write permissions may be established. More particularly, in conventional MOESI/MESI protocols, a cache block must be in M or E state before it can be written with new data. In other words, the cache block must have write permissions, which are conventionally also linked with read permissions. Therefore, a data fetch for the cache block from the point of coherence is required even if the intent is only to write to the cache block and not read the data from the cache block. Therefore the net cost for writing to a cache block involves the cost of fetching the data in addition to the cost of obtaining write permissions. While the cost of obtaining write permissions alone may be the cost associated with snooping other same level caches, the cost associated with fetching the data may include the costs for checking every level of higher level cache, potentially all the way to main memory, in order to determine the backing storage level where the data exists, and then fetching the data back from that backing storage location. Accordingly, with conventional MOESE/MESI protocols, writing to a cache block may incur large latency costs for obtaining write permissions as well as for obtaining the data, particularly when the data needs to be fetched from a high level backing storage such as main memory.

While processors which support out-of-order execution may sometimes be able to hide the delay associated with this process by performing other operations in parallel, the process of establishing write permissions may cause severe delays when in-order execution may be mandated by processing requirements or micro-architectural design constraints. Moreover, the process of establishing write permissions may have to be repeated every time a processor desires to write a cache line/block.

Coming now to exemplary embodiments, in contrast to the above behavior of conventional implementations, exemplary embodiments establish a WDI state for cache block CB in this first scenario. Establishing the WDI state in this first scenario as such may entail obtaining write permissions, but only for the first time a write request for cache block CB from processor 102 is received. As with conventional implementations, in exemplary embodiments, obtaining write permissions for this first time may involve snooping to determine whether any other copies of cache block CB exist in other first level caches, such as L1 cache 108 associated with processor 104. However, in contrast to conventional implementations, a copy of cache block CB does not have to be brought into L1 cache 106 prior to establishing the WDI state.

Accordingly, in this first scenario, once the WDI state has been established, the WDI state may be permanently set for cache block CB in L1 cache 106. This means that for any future write requests to cache block CB, the need for waiting for write permissions at L1 cache 106 is eliminated, and the write operations can proceed as if cache block CB were in M or E state. Future write requests to cache block CB will observe that the WDI state is asserted and the write operation may proceed directly to the next level in the memory hierarchy, such as L2 cache 112, without writing the data to L1 cache 106. As can be seen from the description, the WDI state may be implemented in a write-through cache. Exemplary WDI states may also be extended to write-back cache implementations. For example, once the WDI state is established in L1 cache 106, a higher level cache, such as L2 cache 112 may accumulate the writes which pass through the WDI state in L1 cache 106, wherein L2 cache 112 may be implemented as a write-back cache. Some embodiments may be further customized such that selected lines of L2 cache 112 may be earmarked for accumulating data passing through cache block CB promoted to WDI state in L1 cache 106, and these selected lines may follow a write-back policy for transferring the accumulated data to higher levels of memory/backing storage locations. Regardless of whether a write-through or a write-back policy is in place, the WDI state may signify that no other cache has read permissions for associated cache block CB.

A second scenario will now be described wherein for a write data request to cache block CB, a miss in L1 cache 106 is encountered. In other words, L1 cache 106 lacks the data corresponding to cache block CB, which corresponds to cache block CB being present in the invalid (I) state. Therefore, cache block CB lacks exclusivity and cannot be written. As will be recalled, with conventional MOESI/MESI implementations, cache block CB present in I state, may entail traversing the backing storage levels of memory hierarchy to find cache block CB with requisite permissions, fetching cache block CB into L1 cache 106, and then writing the requested data to cache block CB. Moreover, because this write would cause new data to be written to cache block CB, the write will need to be accompanied by a write-back process to ensure that the updated data trickles through the various levels of memory hierarchy, and ultimately to main memory 114 if required. Also, with conventional implementations, establishing write permissions may also entail snooping for other copies of cache block CB.

However, exemplary embodiments may diverge from conventional implementations in the second scenario thus: once the miss is encountered, a read-with-intent-to-modify operation may be executed to initiate a process of obtaining write permissions, and a cache block for cache block CB may be allocated in L1 cache 106. Allocating a cache block for cache block CB may be performed by blocking off or reserving a cache block in L1 cache 106, by allocating tags associated with cache block CB to the reserved cache block. If no vacancies exist in L1 cache 106, then the reserved cache block may replace one of the existing entries in L1 cache 106 according to replacement policies, such as pseudo least recently used (PLRU), or random replacement, that are known in the art.

Executing the read-with-intent-to-modify operation may involve searching for cache block CB with requisite permissions. This may be found, for example, in L2 cache 112. Thereafter, instead of fetching cache block CB into L1 cache 106, a "dataless" fetch is performed, i.e. only the write permissions for cache block CB are obtained from L2 cache 112 to the reserved cache block in L1 cache 106. Following this process, the reserved cache block with the tags for cache block CB is promoted to a WDI state. As previously described with regard to the first scenario, any future write requests for cache block CB will now encounter the WDI state and proceed to writing the data in the next level of backing storage in the memory hierarchy without writing the data to L1 cache 106. Obtaining write permissions and reallocation of tags for the reserved cache block in L1 cache 106 is unnecessary for future writes, once the WDI state has been established.

In alternative embodiments, it may be possible to write the data cache block CB present in WDI state in L1 cache 106. However, providing such capability for data writes may require additional features. For example, if cache block CB is of a size less than an entire cache line in L1 cache 106, then byte enables corresponding to cache block CB may need to be provided; write-back of the part of the line comprising cache block CB may have to be enabled; read hit determination capability for the part of the line comprising cache block CB may need to be provided, even if only that part of the line is valid; and the capability for merging the written data with backing storage must be provided in cases where the line, but not the data in cache block CB, hits on a read operation. While it will be understood that these alternative embodiments are within the scope of this disclosure, the description herein is primarily directed to embodiments which proceed with write operations by not writing data in cache block CB once the WDI state is established.

Returning to the above second scenario, a miss may be encountered in both L1 cache 106 as well as L2 cache 112 for cache block CB. L2 cache 112 may continue to remain the point of coherence, for example between L1 cache 106 and L1 cache 108. In conventional implementations, a miss in both L1 and L2 caches for a cache block may entail fetching the cache line which comprises the cache block from main memory, and returning this cache line to both the L1 and L2 caches before the cache block may be written to the L1 cache. As can be readily recognized, this process of handling a miss in L1 and L2 caches may incur severe delays in conventional implementations. In contrast, exemplary embodiments may handle the miss in L1 cache 106 and L2 cache 112 by directly establishing the WDI state for cache block CB in L1 cache 106, thereby avoiding any need for fetching a corresponding cache line from main memory 114 into L2 cache 112 or L1 cache 106. Thus, the delays incurred due to a write miss for cache block CB by processor 102 are greatly reduced in exemplary embodiments. Moreover, implementations which may include a write buffer for holding data to be written back in write-back cache architectures, may be cleared faster in exemplary embodiments, because associating the WDI state may allow a direct write through to these write buffers without involving delays associated with obtaining write permissions.

For the sake of completeness, a third and fourth scenario will now be described briefly. The third scenario comprises encountering a hit in L1 cache 106 for cache block CB with requisite write permissions or exclusivity. This may correspond to either the exclusive (E) state or the modified (M) state. Regardless of whether it is in the E or M state, the write can be performed to cache block CB as with conventional implementations. In the fourth scenario, the cache block CB is encountered without data but with exclusivity. In other words, the fourth scenario represents a WDI state that has been created in the above-described manner. Accordingly, in this fourth scenario, the write operation proceeds in exemplary embodiments without entailing any additional delays.

Thus, it can be seen that regardless of how the WDI state is established for cache block CB, once it has been established, all writes in exemplary embodiments to cache block CB proceed without encountering any delays at L1 cache 106, because write permissions are guaranteed. It will be understood that cache block CB in L1 cache 106 does not contain any valid data, but merely exists as a guidepost to direct the data write to the next level of memory hierarchy. Once at the next higher level of memory hierarchy, such as L2 cache 112, an associated L2 cache directory (not specifically shown) may have the necessary write permissions. In exemplary embodiments, if L2 cache 112 does not have the necessary write permissions, the data write may be handled by establishing a similar WDI state at L2 cache 112 as well to write the data through to the next memory level. In other embodiments, steps may be followed to establish an (M) or (E) state at L2 cache 112, corresponding to cache block CB. Embodiments may also employ mechanisms such as miss information/status handling registers (MSHRs), which are known in the art for tracking outstanding misses, in order to handle the data write of cache block CB if write permissions are not available at L2 cache 112. Some embodiments may also simply perform a conventional write through of the data at the L2 cache 112 level for cache block CB. Accordingly, suitable implementations may be chosen for handling data writes for cache block CB at the next higher level of memory hierarchy, such as L2 cache 112, once the WDI state has been established at L1 cache 106.

In some implementations, the WDI state may be interpreted as an invalid (I) state for read operation. Thus, if processor 102 were to request a read operation for data in cache block CB, then it would encounter the WDI state and recognize that any associated data it might find therein would be invalid. In this manner, write operations for particular cache blocks may be tailored by establishing a WDI state for the cache block, thereby speeding up write operations.

Figure 4A:
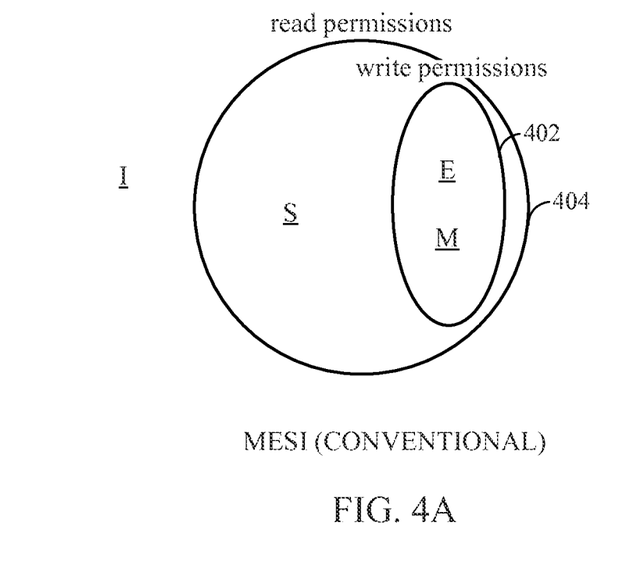
FIGS. 4A-B, illustrate distinctions between conventional implementations and exemplary embodiments in the form of Venn diagrams for corresponding read/write permissions.
Figure 4B:
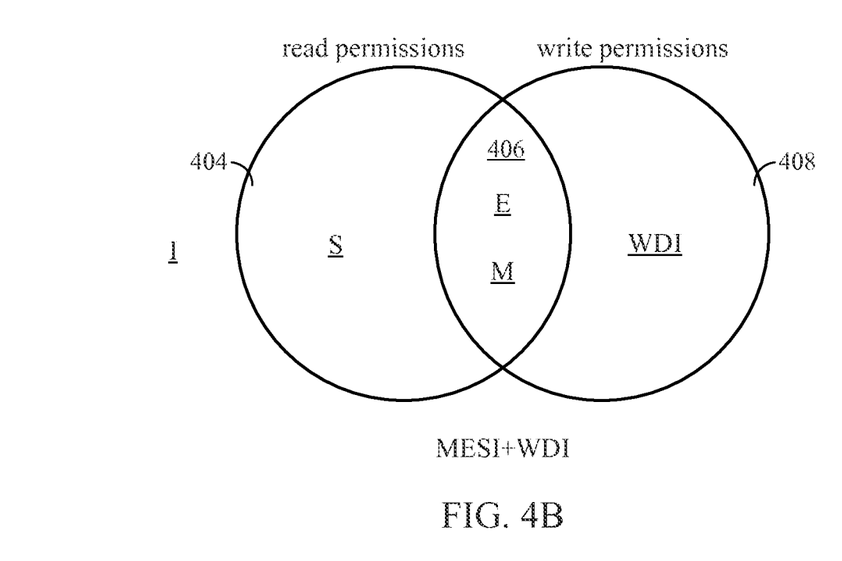

With reference now to FIGS. 4A-B, the above-described distinctions between conventional implementations and exemplary embodiments are illustrated in the form of Venn diagrams for corresponding read/write permissions. FIG. 4A illustrates a conventional MESI implementation. The region 402 represents the states of cache block CB which have both write and read permissions. As shown, exclusive (E) and modified (M) states fall under region 402. Region 404 represents states of cache block CB which have read permissions but not write permissions. Shared (S) state falls under region 402. Invalid (I) state has neither read nor write permissions, and hence is illustrated outside both regions 402 and 404.

Turning now to FIG. 4B, permissions for exemplary embodiments including the WDI state are illustrated. Similar to FIG. 4A, region 406 comprises exclusive (E) and modified (M) states which have both read and write permissions, and region 404 comprises (S) state with read permissions but not write permissions. The exemplary WDI state falls under region 408 which has write permissions but not read permissions, because it does not have valid data. As before, invalid (I) state has neither read nor write permissions.

In some embodiments, the same cache block CB may be shared across two or more caches, such as L1 caches 106 and 108. Thus, the state of cache block CB may be Shared (S). However, both entries for cache block CB in L1 caches 106 and 108 may be promoted to the WDI state by the above-described processes. Thereafter, both processors 102 and 104 may write data to cache block CB through their corresponding L1 caches 106 and 108 without waiting for write permissions to be established, because write permissions have already been established by creating the WDI state. In these embodiments, it is possible for a contention to arise at the next higher level cache, e.g. L2 cache 112 because of independent writes to the cache block CB present in WDI state in both L1 caches 106 and 108. In order to resolve such contentions, the data that gets written through to L2 cache 112 from the two sources, cache block CB present in WDI state in both L1 caches 106 and 108, can be queued to a central point of coherence, and the data which was written last may be allowed to win the contention. If both writes occur simultaneously, a selected protocol can be in place to pick one of the writes to be delayed. However, it will be recognized that in practice, such contentions may be very rare, and programming models may be specified to avoid such contentions from arising in the first place.

On the other hand, in some embodiments, if cache block CB is shared among L1 caches 106 and 108, then if one of the entries is promoted to a WDI state, then other copies may be invalidated. For example, if cache block CB in L1 cache 106 is promoted to a WDI state, then processor 102 (or any other appropriate logic) may send a snoop-invalidate request to processor 104 (or directly to L1 cache 108) to invalidate the entry for cache block CB in L1 cache 108. In this manner, it may be ensured that only one L1 cache may have cache block CB in the WDI state, thus ensuring that the L2 cache directory may have write permissions for cache block CB pointing to at most one L1 cache.

As previously noted, the above-described processes are not limited to cache blocks of any particular size. In some embodiments the above-described processes may be employed for promoting cache block CB in L1 cache 106 to a WDI state. Thereafter, L2 cache 112 may merge the cache blocks from several write operations into a cache line. For example, if the cache line size is 128-bits and the size of each cache block is 32-bits, then processor 102 may perform four write operations of 32-bit cache blocks to a cache line, which may pass through L1 cache 106 with WDI state asserted for each 32-bit cache block. The four 32-bit cache blocks may then be accumulated at L2 cache 112 as they arrive, and merged into a 128-bit cache line. Thereafter, the 128-bit merged cache line may be written back to main memory 114. Moreover, embodiments in which two or more shared copies of a cache block CB are allowed to exist in WDI state, such as in both L1 caches 106 and 108, cache block writes may be merged at L2 cache 112 from both sources, L1 caches 106 and 108. In some embodiments, separate coalescing buffers or downstream buffers (not shown) may also be configured to merge cache block writes from the L1 caches 106 and 108 without involving L2 cache 112 for such operations.

In some exemplary embodiments, backing storage elements in higher levels of memory hierarchy, such as L2 cache 112 may also be configured to support a WDI state. In other words, the state of cache block CB may be promoted to a WDI state in L2 cache 112 as well. This would cause writes to skip writing data in both L1 cache 106, as well as L2 cache 112, and proceed to higher levels of memory hierarchy, such as main memory 114. Any number of higher levels of memory hierarchy, up until the ultimate main memory location may be configured thus, to cause write operations to be directly written to the ultimate storage location by skipping all intermediate caches and backing storage elements. Moreover, in some embodiments, higher levels caches such as L2 cache 112 may also support other states such as exclusive (E) or shared (S) for cache block CB. The state of cache block CB in L2 cache 112 may be established based on particular applications or needs in multiprocessor system 100. Further, in some embodiments, coalescing buffers or other downstream buffers as previously described for merging, may also be configured to support a WDI state. For example, exemplary coalescing buffers may be configured to support merging writes to cache block CB from two different sources such as L1 caches 106 and 108. The merged version of cache block CB in the exemplary coalescing buffer may have an associated WDI state such that a write-through operation may be supported at the exemplary coalescing buffer as well.

Figure 2:
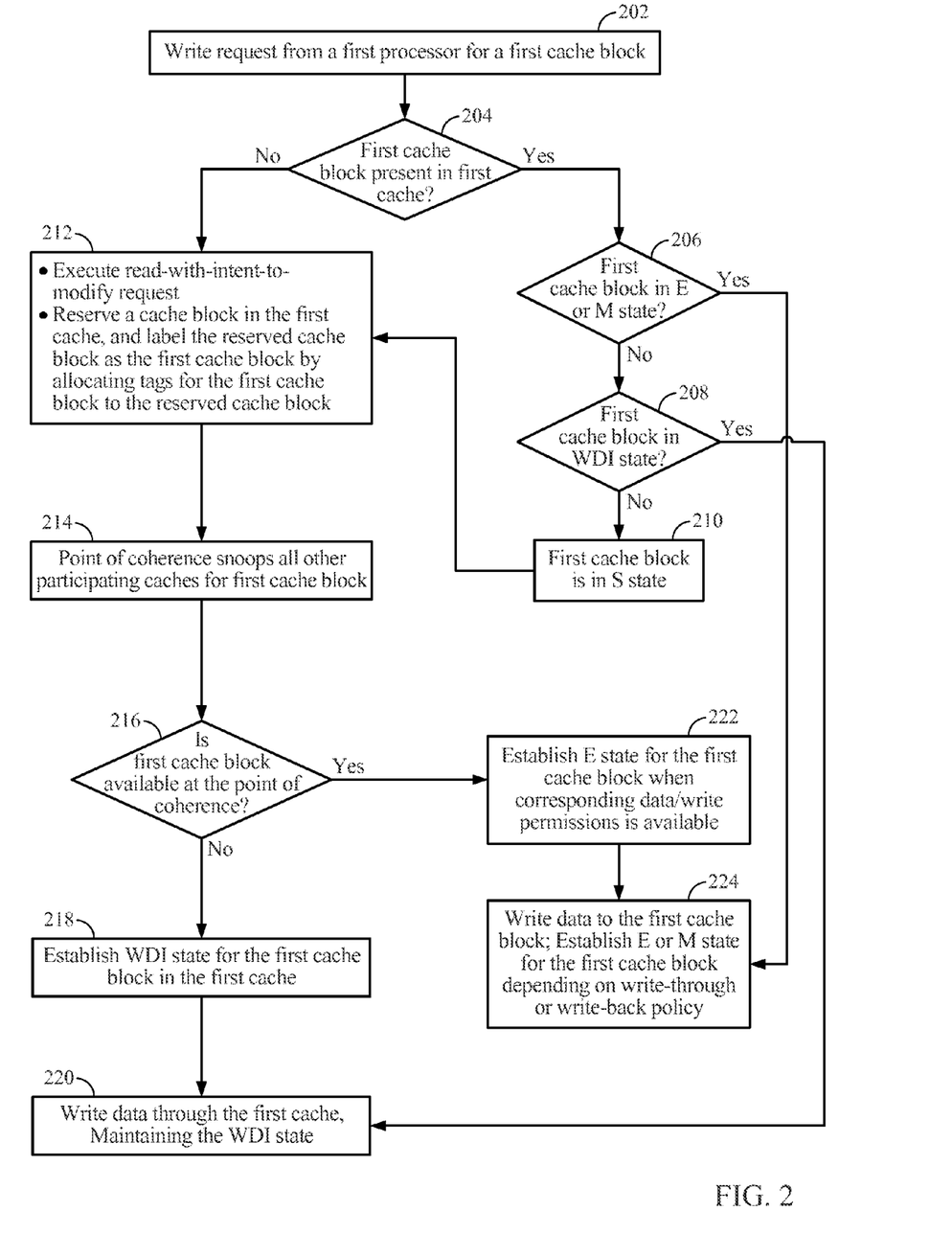
FIG. 2 is a flow-chart illustrating an operational flow for establishing a write-data-invalid state for a cache entry according to exemplary embodiments.

With reference now to FIG. 2, an operational flow for establishing a WDI state for a first cache entry (e.g. cache block CB) according to exemplary embodiments is illustrated. The operational flow begins at Block 202 with a write request from a processor (e.g. processor 102) for the first cache entry. At Block 204, a first cache (e.g. L1 cache 106) is queried to determine if the first cache entry is present therein. Thereafter, the operation flow splits between the paths leading to Blocks 206 and 212 depending on whether there is a hit (e.g. first scenario as discussed above) or a miss (e.g. second scenario).

Accordingly, if the first cache entry is present in the first cache, the operational flow enters Block 206, wherein the coherence states and write permissions of the cache entry are checked. If the first cache entry is in either exclusive (E) or modified (M) state, then it will be determined that write permissions already exist for the first cache entry in the first cache. Therefore, the write request may proceed with the corresponding write operation of data to the first cache, based on whether a write-back or a write-through policy is in place. In other words, if in Block 206, it is determined that the first cache entry is in E or M state, then the operational flow transitions directly to Block 224 as illustrated.

On the other hand if at Block 206, it is determined that the first cache entry is present, but it is in neither E nor M state, then the process enters Block 208 where it checked whether the first cache entry has already been set to the WDI state (for example, by a previous attempt to write data to the first cache entry by the first processor). If the first cache entry is already in the WDI state, then the process transitions to Block 220, wherein the WDI state is maintained for the first cache entry and the write operation proceeds as a write-through with respect to the first cache, and writing the data, to a next level cache or backing storage as previously described. On the other hand, if at Block 208, it is determined that the first cache entry is not present in the WDI state either, then the process enters Block 210, where it is determined that the first cache entry must be in a shared (S) state. Thereafter, the process enters Block 212. Block 212 may also be reached from Block 204 when there is a miss (e.g. second scenario as previously described) for the first cache entry, or in other words, when the first cache entry is in an invalid (I) state.

Block 212 will now be described. In Block 212, the first cache entry is either assumed to be missing (or alternately, present in the invalid (I) state), or present in the shared (S) state as determined in Block 210. Therefore in Block 212, write permissions do not exist for the first cache entry. Accordingly, a process for obtaining write permissions may be initiated, for example, by executing a read-with-intent-to-modify operation as previously described. Additionally, a cache entry may be reserved in the first cache and tags corresponding to the first cache entry may be allocated to the reserved cache entry.

The process then transitions to Block 214, where the point of coherence is determined. This may be a next level cache or backing storage (e.g. L2 cache 112 or main memory 114). The point of coherence snoops all other participating caches (e.g. L1 cache 108) to see if the first cache entry is present therein. Based on the result of the snooping, the latest copy of the first cache entry may be retrieved and consolidated at the point of coherence.

Thereafter, at Block 216, it is determined whether the first cache entry is now available at the point of coherence. If the first cache entry is not available at the point of coherence, then in order to establish E or M states, the data corresponding to the first cache entry will need to be fetched from backing storage. Accordingly, the cost associated with establishing an E or M state will be very high. Therefore, when the first cache entry is not available at the point of coherence, the lower cost solution would be to establish the WDI state instead. Accordingly, at Block 218, the WDI state is established for the first cache entry at the first cache, and the process enters Block 220. As previously described with regard to Block 220 the data corresponding to the first cache entry is written as a write-through operation with respect to the first cache.

On the other hand, if at Block 216, it is determined that the first cache entry is present in the point of coherence with the required write permissions, the cost associated with fetching the data therein is the same as the cost for retrieving write permissions for the first cache entry. In this case, the first cache entry may be fetched in E or M state, because the costs for establishing the E or M state would be the same as the costs for establishing the WDI state. Accordingly, the data may be written to the reserved cache entry (allocated as the first cache entry) in the first cache in some embodiments, and the state of the reserved cache entry may be set to exclusive (E) state at Block 222. In some embodiments, a smart directory (not shown) may be maintained at Block 216 to examine a write request to the first cache entry. The write request may be treated as a read-with-intent-to-modify request. The smart directory may analyze the latency involved with establishing either the M/E states or the WDI state, based on whether the first cache entry is available at the point of coherence. The smart directory may then return the first cache entry to the first cache in the E or M state if the first cache entry is available at the point of coherence, or return write permissions (i.e. establish WDI state) if the first cache entry is not available at the point of coherence.

From Block 222, the process may enter Block 224. As previously described, at Block 224, the first processor may proceed to write the first cache entry with the data according to the write-back or write-through policy which may be in place.

Figure 3:
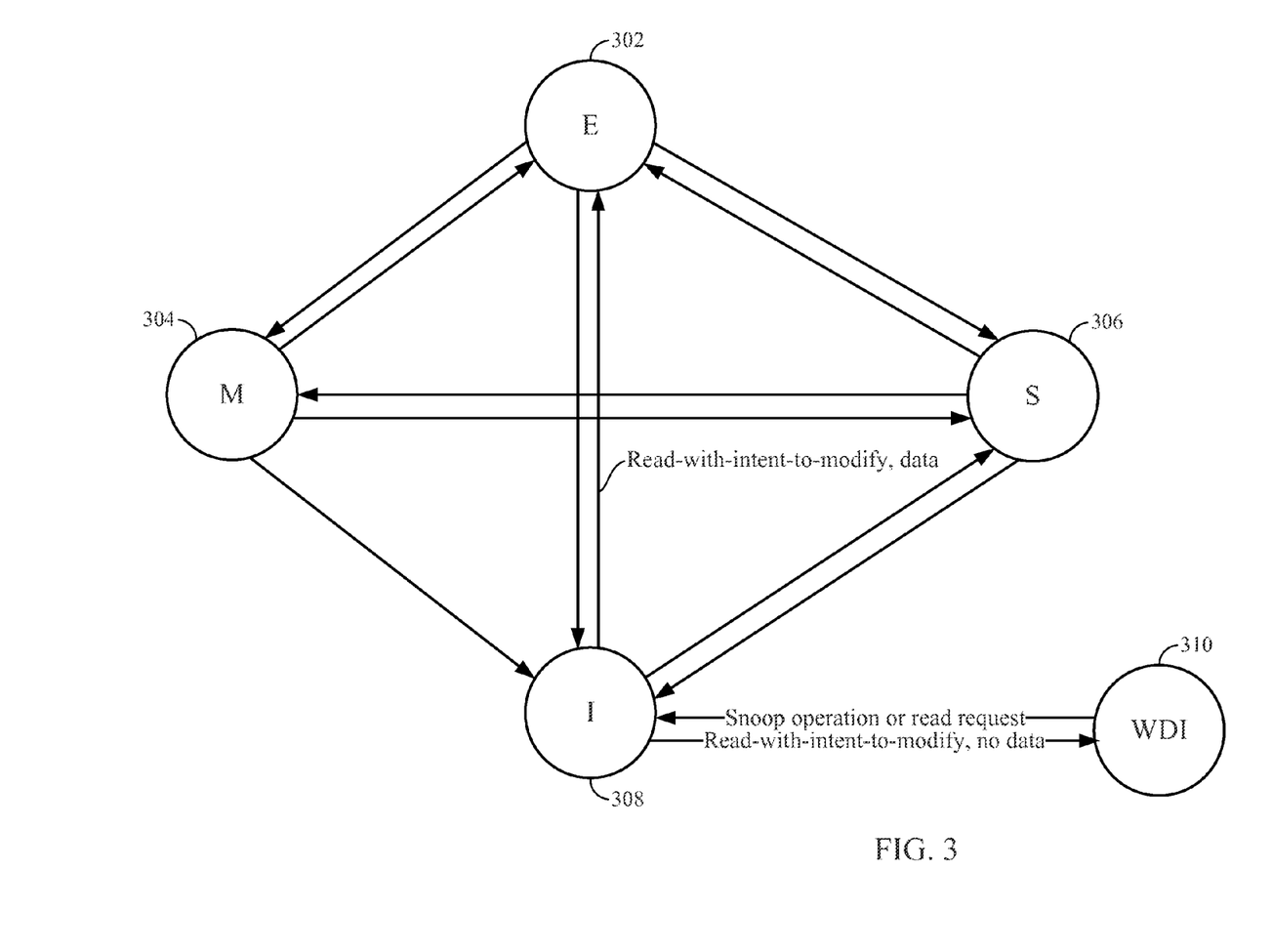
FIG. 3 is a state diagram illustrating transitions among coherence states of a cache block in a cache, according to exemplary embodiments.

With reference now to FIG. 3, a state diagram is shown depicting the coherence states and accompanying transitions for a first cache block (e.g. cache block CB) in a first cache (e.g. L1 cache 106) with regard to a write request from a first processor (e.g. processor 102). The WDI state according to exemplary embodiments is shown in conjunction with M/E/S/I states which have been previously described, in order to provide an example of introducing the WDI state in addition to conventional M/E/S/I states in exemplary embodiments. Transitions between exclusive (E) 302, modified (M) 304, shared (S) 306, and invalid (I) 308 states may generally be configured according to known techniques. Notable additions to incorporate the WDI 310 state will now be discussed.

Starting at state (I) 308 for the first cache block, if a write request is encountered, a read-with-intent-to-modify operation may be executed (similar to Block 212 of FIG. 2). If the first cache block is available at the point of coherence, then valid data for the first cache block may be retrieved from the point of coherence, and thus the state may transition from I 308 to E 302 (similar to Block 222 of FIG. 2). On the other hand, the point of coherence may not have valid data for the first cache block and the state may transition from I 308 to WDI 310. In other words, the transition to WDI 310 may occur when it may be quickly determined that at the point of coherence that no other cache (such as L1 cache 108) holds a copy of the first cache block.

Once in state WDI 310, the state may transition to I 308, if a second processor (e.g. processor 104) wants to read the first cache block or wishes to perform a read-with-intent-to-modify operation on the first cache block. In order to accomplish this, the second processor may generate a variety of snoop operations based on particular design considerations. The second processor may decide to invalidate any cache block whose address corresponds to the first cache block. Alternately, the second processor may request that the first cache block be transitioned to state S 306 if it was previously found in state E 302 or M 304 in the first cache. In yet another alternate scenario, the second processor may try to proceed with reading the first cache block which is in state WDI 310, which would cause a transition to state 1308. Thereafter, a read operation may be performed to fetch the data corresponding to the first cache block, which would then transition the state to E 302 or S 306 accordingly.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Figure 5:
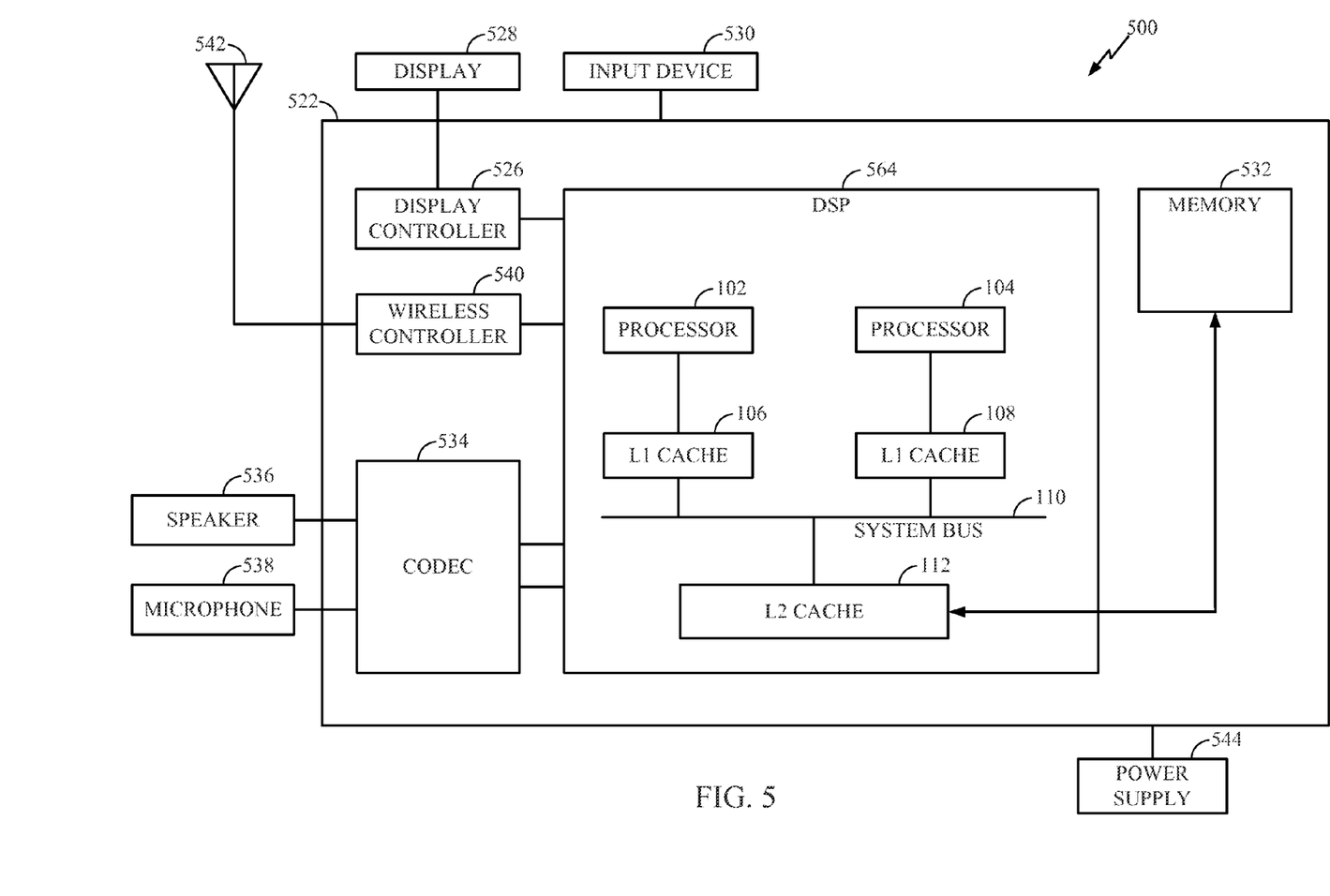
FIG. 5 illustrates an exemplary wireless communication system 500 in which an embodiment of the disclosure may be advantageously employed.

Referring to FIG. 5, a block diagram of a particular illustrative embodiment of a wireless device that includes a multi-core processor configured according to exemplary embodiments is depicted and generally designated 500. The device 500 includes a digital signal processor (DSP) 564, which may include components of FIG. 1 such as processors 102, 104, L1 caches 106, 108, and L2 cache 112 coupled to memory 532 as shown. FIG. 5 also shows display controller 526 that is coupled to DSP 564 and to display 528. Coder/decoder (CODEC) 534 (e.g., an audio and/or voice CODEC) can be coupled to DSP 564. Other components, such as wireless controller 540 (which may include a modem) are also illustrated. Speaker 536 and microphone 538 can be coupled to CODEC 534. FIG. 5 also indicates that wireless controller 540 can be coupled to wireless antenna 542. In a particular embodiment, DSP 564, display controller 526, memory 532, CODEC 534, and wireless controller 540 are included in a system-in-package or system-on-chip device 522.

In a particular embodiment, input device 530 and power supply 544 are coupled to the system-on-chip device 522. Moreover, in a particular embodiment, as illustrated in FIG. 5, display 528, input device 530, speaker 536, microphone 538, wireless antenna 542, and power supply 544 are external to the system-on-chip device 522. However, each of display 528, input device 530, speaker 536, microphone 538, wireless antenna 542, and power supply 544 can be coupled to a component of the system-on-chip device 522, such as an interface or a controller.

It should be noted that although FIG. 5 depicts a wireless communications device, DSP 564 and memory 532 may also be integrated into a set-top box, a music player, a video player, an entertainment unit, a navigation device, a personal digital assistant (PDA), a fixed location data unit, or a computer. A processor (e.g., DSP 564) may also be integrated into such a device.

Accordingly, an embodiment of the invention can include a computer readable media embodying a method for accessing memory in a multiprocessor system and maintaining coherency. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of maintaining coherency in a multi-processor system comprising:
establishing a state including: a write-data-invalid (WDI) state for a first cache entry in a first cache, wherein the WDI state comprises permission for a first processor associated with the first cache, to write to one or more higher levels of memory hierarchy for a write request to the cache entry by the first processor, and wherein the WDI state is treated as an invalid state for a read request to the first cache entry by the first processor.

2. The method of claim 1, wherein the first cache entry is a cache block.

3. The method of claim 1, wherein the first cache entry is a cache line.

4. The method of claim 1, wherein establishing the WDI state further comprises allocating a tag for the first cache entry.

5. The method of claim 1, wherein for a read, the first cache entry does not require reallocation of a tag.

6. The method of claim 1, wherein the first cache entry is present in a second cache associated with a second processor in a WDI state.

7. The method of claim 1, wherein establishing the WDI state comprises determining that no valid/dirty copies of the first cache entry are present in other caches of the multiprocessor system.

8. The method of claim 1, wherein establishing the WDI state for the first cache entry further comprises prohibiting fetching the first cache entry into the first cache.

9. The method of claim 1, wherein a write operation to the first cache entry in the WDI state further comprises sending a snoop-invalidate to other caches comprising the first cache entry.

10. The method of claim 9, wherein sending a snoop-invalidate to other caches comprising the first cache entry, comprises only sending a snoop-invalidate to other caches comprising the first cache entry in a shared state.

11. The method of claim 1, further comprising: configuring a second level cache in a higher level of memory hierarchy to accumulate stores from the first cache and merge the stores into cache lines.

12. The method of claim 11, wherein if the second level cache is not a last level of coherency, configuring the second level cache to support at least WDI, exclusive, and modified states for the first cache entry.

13. The method of claim 1, further comprising: configuring a coalescing buffer or a downstream buffer to merge stores from the first cache and a second cache for the first cache entry to form a merged cache entry.

14. The method of claim 13, further comprising establishing a WDI state for the merged cache entry.

15. The method of claim 1, further comprising, establishing the WDI state based on a read-with-intent-to-modify request to the first cache entry by the first processor.

16. The method of claim 1, wherein the WDI state is established for the first cache entry in a second level cache in response to a miss in the first cache for the first cache entry.

17. The method of claim 1, wherein establishing the WDI state for the first cache entry incurs a latency value higher than a latency value for fetching data corresponding to the first cache entry in response to a write or read request for the first cache entry by the first processor.

18. A multi-processor system comprising:
    a first processor;
    a first cache;
    one or more higher levels of memory hierarchy; and
    a write-data-invalid (WDI) state associated with a first cache entry of the first cache, wherein the WDI state comprises permission for the first processor to write to the one or more higher levels of memory hierarchy for a write request to the first cache entry by the first processor, and wherein the WDI state is treated as an invalid state for a read request to the first cache entry by the first processor.

19. The multi-processor system of claim 18, wherein the first cache entry is a cache block.

20. The multi-processor system of claim 18, wherein the first cache entry is a cache line.

21. The multi-processor system of claim 18, wherein the WDI state further comprises a tag allocated for the first cache entry.

22. The multi-processor system of claim 18, wherein for a read, the first cache entry does not require reallocation of a tag.

23. The multi-processor system of claim 18, wherein the first cache entry is present in a second cache associated with a second processor in a WDI state.

24. The multi-processor system of claim 18, wherein the WDI state indicates that no valid/dirty copies of the first cache entry are present in other caches of the multi-processor system.

25. The multi-processor system of claim 18, wherein the WDI state for the first cache entry prohibits fetching the first cache entry into the first cache.

26. The multi-processor system of claim 18, wherein a write operation to the first cache entry in the WDI state is configured to send a snoop-invalidate to other caches comprising the first cache entry.

27. The multi-processor system of claim 26, the snoop-invalidate is only sent to other caches comprising the first cache entry in a shared state.

28. The multi-processor system of claim 18, further comprising: a second level cache in a higher level of memory hierarchy configured to accumulate stores from the first cache and merge the stores into cache lines.

29. The multi-processor system of claim 28, wherein the second level cache is not a last level of coherency, and wherein the second level cache is further configured to support at least WDI, exclusive, and modified states for the first cache entry.

30. The multi-processor system of claim 18, further comprising: a coalescing buffer or a downstream buffer configured to merge stores from the first cache and a second cache for the first cache entry to form a merged cache entry.

31. The multi-processor system of claim 30, further comprising a WDI state established for the merged cache entry.

32. The multi-processor system of claim 31, wherein the WDI state is established based on a read-with-intent-to-modify request to the first cache entry by the first processor.

33. The multi-processor system of claim 18, wherein the WDI state is established for the first cache entry in a second level cache in response to a miss in the first cache for the first cache entry.

34. A multi-processor system comprising:
    a first processor;
    a first memory means;
    one or more higher levels of memory hierarchy; and
    a write-data-invalid (WDI) means associated with a first entry of the first memory means, wherein the WDI means comprises permission for the first processor to write to the one or more higher levels of memory hierarchy for a write request to the first entry by the first processor, and wherein the WDI means is treated as an invalid state for a read request to the first entry by the first processor.

35. A non-transitory computer-readable storage medium comprising code, which, when executed by a processor, causes the processor to perform operations for maintaining coherency in a multi-processor system, the non-transitory computer-readable storage medium comprising:
    code for establishing a state including: a write-data-invalid (WDI) state for a first cache entry in a first cache, wherein the WDI state comprises permission for a first processor associated with the first cache, to write to one or more higher levels of memory hierarchy for a write request to the cache entry by the first processor, and wherein the WDI state is treated as an invalid state for a read request to the first cache entry by the first processor.

36. A method of managing a cache comprising:
    receiving a write request for a first cache block from a processor;
    determining that the first cache block is not present in the cache;
    executing a read-with-intent-to-modify request for the first cache block;
    reserving a reserved cache block in the cache;

assigning tags associated with the first cache block to the reserved cache block;
determining a point of coherence for the first cache block in a memory hierarchy comprising the cache;
determining that the first cache block is not available at the point of coherence;
establishing a write-data-invalid state for the reserved cache block; and
performing a write-through operation to the reserved cache block for data associated with the write request.

* * * * *